United States Patent [19]
Bekele

[11] Patent Number: 5,759,702
[45] Date of Patent: Jun. 2, 1998

[54] VINYLIDENE CHLORIDE COMPOSITION AND FILM MADE THEREFROM

[75] Inventor: Solomon Bekele, Taylors, S.C.

[73] Assignee: W. R. Grace & Co.-Conn., Duncan, S.C.

[21] Appl. No.: 783,529

[22] Filed: Jan. 14, 1997

Related U.S. Application Data

[63] Continuation of Ser. No. 300,359, Sep. 2, 1994, abandoned, which is a continuation of Ser. No. 922,672, Aug. 6, 1992, abandoned, which is a continuation-in-part of Ser. No. 749,057, Aug. 23, 1991, Pat. No. 5,202,188.

[51] Int. Cl.$^6$ ............................................. B32B 27/08
[52] U.S. Cl. ...................................... 428/518; 525/227
[58] Field of Search ............................. 524/114, 308; 525/239, 427, 227; 428/518; 526/329.7

[56] References Cited

U.S. PATENT DOCUMENTS

| | | | |
|---|---|---|---|
| Re. 29,040 | 11/1976 | Marzolf | 260/42 |
| 2,205,449 | 6/1940 | Wiley | 18/48 |
| 2,320,112 | 5/1943 | Wiley | 18/18 |
| 2,431,078 | 11/1947 | Powell, III | 260/32 |
| 2,562,204 | 7/1951 | Milton, Jr. | 18/58 |
| 2,862,023 | 11/1958 | Fields | 260/485 |
| 2,919,059 | 12/1959 | Sporka | 229/3.5 |
| 3,084,065 | 4/1963 | Bach | 525/227 |
| 3,144,425 | 8/1964 | Koch et al. | 260/29 |
| 3,165,491 | 1/1965 | Butzler et al. | 260/31 |
| 3,166,526 | 1/1965 | Butzler et al. | 260/31 |
| 3,194,778 | 7/1965 | Butzler et al. | 260/31 |
| 3,206,427 | 9/1965 | Butzler et al. | 260/31 |
| 3,224,996 | 12/1965 | Balmer et al. | 260/31 |
| 3,275,716 | 9/1966 | Wiggins | 260/899 |
| 3,373,229 | 3/1968 | Philpot et al. | 525/227 |
| 3,375,216 | 3/1968 | Smith et al. | 260/30 |
| 3,375,217 | 3/1968 | Smith et al. | 260/30 |
| 3,426,101 | 2/1969 | Ryan et al. | 260/876 |
| 3,524,795 | 8/1970 | Peterson | 161/165 |
| 3,678,133 | 7/1972 | Ryan | 260/876 |
| 3,741,253 | 6/1973 | Brax et al. | 138/137 |
| 3,846,828 | 11/1974 | Klein | 260/33 |
| 3,859,384 | 1/1975 | Carty et al. | 260/876 |
| 3,859,389 | 1/1975 | Carty et al. | 260/885 |
| 3,867,481 | 2/1975 | Whang | 260/899 |
| 3,923,720 | 12/1975 | Coaker et al. | 260/31 |
| 3,948,674 | 4/1976 | Coaker et al. | 106/178 |
| 4,112,181 | 9/1978 | Baird, Jr. et al. | 428/336 |
| 4,144,289 | 3/1979 | Watanabe et al. | 260/897 |
| 4,156,703 | 5/1979 | Harrop | 521/134 |
| 4,184,993 | 1/1980 | Singh et al. | 260/31 |
| 4,203,880 | 5/1980 | Stoloff et al. | 524/568 |
| 4,210,565 | 7/1980 | Emmons | 260/29 |
| 4,212,958 | 7/1980 | Falk | 525/310 |
| 4,269,740 | 5/1981 | Woods et al. | 260/4 R |
| 4,320,175 | 3/1982 | Hisazumi et al. | 428/518 |
| 4,360,612 | 11/1982 | Trumbull et al. | 523/351 |
| 4,399,248 | 8/1983 | Singh et al. | 524/205 |
| 4,401,788 | 8/1983 | Hiyoshi et al. | 524/714 |
| 4,418,168 | 11/1983 | Johnson | 524/109 |
| 4,486,378 | 12/1984 | Hirata et al. | 264/512 |
| 4,542,185 | 9/1985 | Meunier | 525/70 |
| 4,547,428 | 10/1985 | Bekker et al. | 428/402 |
| 4,567,234 | 1/1986 | Meunier | 525/73 |
| 4,686,148 | 8/1987 | Havens | 428/520 |
| 4,698,111 | 10/1987 | Havens | 156/244 |
| 4,746,705 | 5/1988 | Courtis et al. | 525/308 |
| 4,863,784 | 9/1989 | Lustig et al. | 428/518 |
| 4,950,718 | 8/1990 | Burgert et al. | 525/185 |
| 4,959,416 | 9/1990 | Sun | 525/222 |
| 4,963,622 | 10/1990 | Heitz | 525/227 |
| 4,965,136 | 10/1990 | Mueller | 428/414 |
| 5,001,192 | 3/1991 | Sun | 525/76 |
| 5,030,511 | 7/1991 | Moffitt | 428/336 |
| 5,035,955 | 7/1991 | Matsukura et al. | 428/520 |
| 5,041,287 | 8/1991 | Driggers et al. | 424/81 |
| 5,055,529 | 10/1991 | Kishida et al. | 525/309 |
| 5,077,331 | 12/1991 | Fahey et al. | 524/317 |
| 5,084,500 | 1/1992 | Yamada et al. | 524/417 |
| 5,164,447 | 11/1992 | Gaggar et al. | 525/227 |
| 5,290,613 | 3/1994 | Shuetz et al. | 428/518 |

FOREIGN PATENT DOCUMENTS

| | | | |
|---|---|---|---|
| 597519 | 5/1990 | Australia . | |
| 968689 | 6/1975 | Canada . | |
| 2030695 | 5/1991 | Canada . | |
| 40543 | 11/1981 | European Pat. Off. | 525/227 |
| 0402173 | 12/1990 | European Pat. Off. . | |
| 2050891 | 3/1971 | Germany . | |
| 2260937 | 6/1973 | Germany . | |
| 2910042 | 9/1979 | Germany | 525/227 |
| 3605405-A | 12/1987 | Germany . | |
| 53-16753 | 2/1978 | Japan . | |
| 61-221253 | 10/1986 | Japan . | |
| WO 91/08260 | 6/1991 | WIPO . | |

Primary Examiner—Veronica P. Hoke
Attorney, Agent, or Firm—David G. Burleson

[57] ABSTRACT

A film with properties such as good thermal stability, enhanced extrudability, improved oxygen barrier properties, and reduced stickiness to metal surfaces is made by the use of a vinylidene chloride composition with small amounts of a plasticizer, such as epoxidized oil or epoxidized alpha olefin, and with an acrylate or styrene polymer, such as methyl methacrylate/butyl acrylate/styrene polymer, butyl acrylate/butyl methacrylate/methyl methacrylate polymer, or poly (alpha-methylstyrene).

17 Claims, No Drawings

VINYLIDENE CHLORIDE COMPOSITION AND FILM MADE THEREFROM

This application is a continuation of U.S. patent application Ser. No. 08/300,359, filed Sep. 2, 1994, now abandoned which is a continuation of U.S. patent application Ser. No. 07/922,672, filed Aug. 6, 1992, now abandoned, which is a continuation-in-part of U.S. patent application Ser. No. 07/749,057, filed Aug. 23, 1991, now U.S. Pat. No. 5,202,188.

FIELD OF INVENTION

This invention relates to films made from vinylidene chloride polymers or copolymers. Specifically, this invention relates to a method and composition for lowering the oxygen transmission and stickiness, and enhancing the thermal stability and extrusion rate of mono-layer and multi-layer packaging films having a plasticized layer of vinylidene chloride copolymer film.

BACKGROUND OF THE INVENTION

Thermoplastic packaging films made of vinylidene chloride copolymer, hereinafter referred to generally as "saran", have been used for a long number of years to package food products which include cheese, fresh and processed meats, and a wide variety of other food and non-food items. (Saran is a trademark registered to Dow in many countries; however, in the United States, saran has become generic for vinylidene chloride polymers and vinylidene chloride copolymers.) Saran films are known to be good barriers to the transmission of oxygen, i.e. have a very low oxygen permeability. Examples of such films are disclosed in U.S. Pat. No. 2,919,059 which issued in December 1959 to Arthur F. Sporka. This patent discloses laminate films of cellophane-saran-polyethylene and polyethylene-saran-polyethylene which are made by treating the polyethylene film surface to enhance its cling sheer strength so that a laminate or multi-layer film can be made by using the inherent attractive forces in the face-to-face surfaces of adjoining plies of preformed film.

A later and more satisfactory method of producing a multi-layer film having a layer of saran is disclosed in U.S. Pat. No. 4,112,181 which issued on Sep. 5, 1978 to William G. Baird, Jr. et al. In this patent a method of coextruding a tubular film is described wherein the walls of the tube have at least three layers, a center layer being a saran layer. The tubular film is subsequently biaxially oriented by the trapped bubble technique.

Another satisfactory method of producing a multi-layer saran film is disclosed in U.S. Pat. No. 3,741,253 which issued on Jun. 26, 1973 to Harri J. Brax et al., which specifically discloses a multi-layer, biaxially oriented film having a saran barrier layer. This film is made by an extrusion coating process in which a substrate of polyethylene or ethylene vinyl acetate copolymer is coextruded in the form of a tube, cross-linked by irradiation, inflated into a tubing, a layer of saran extrusion coated onto the inflated tubing, and then another layer of ethylene-vinyl acetate copolymer is coated onto the saran. After cooling, this multi-layer tubular structure is flattened and rolled up. At a later time, the tube is inflated, sent through a hot water bath where it is heated to its orientation temperature, and as it is drawn out of the bath, it is inflated into a bubble thereby biaxially orienting the film. The bubble is rapidly cooled to set the orientation. This process produces a shrinkable barrier film with low oxygen permeability. Also, the advantages of a cross-linked film are provided without subjecting the saran layer to irradiation which tends to degrade saran.

The barrier layer in the laboratory examples of the above mentioned patent to Brax et al. is a plasticized copolymer of vinylidene chloride and vinyl chloride. The copolymer is a mixture of 10% suspension polymerized and 90% emulsion polymerized copolymer. The emulsion polymerized copolymer comprises about 70% vinylidene chloride and 30% vinyl chloride and the suspension polymerized copolymer comprises about 80% vinylidene chloride and 20% vinyl chloride. Such copolymers are obtainable from the Dow Chemical Company of Midland, Mich. Vinylidene chloride copolymers are also available from Solvay.

In order to be successfully extruded at commercial rates the foregoing described mixture of vinylidene chloride copolymers must be stabilized and plasticized. A successful stabilizer-plasticizer combination is epichlorohydrin/bisphenol A, an epoxy resin sold as EPON resin 828 by the Shell Chemical Company, and 2-ethyl hexyl diphenyl phosphate sold as Santicizer-141 by Monsanto Chemical Co. Other known stabilizers include epoxidized linseed oil and epoxidized soybean oil and citrates. A quite successful and satisfactory plasticizer package is made using approximately 4% of the EPON 828 and approximately 2% of the Santicizer-141 in the foregoing described mixture of vinylidene chloride copolymers.

In Canadian Patent No. 968,689, which was issued on Jun. 5, 1975 to Mario Gillio-tos et al., the effect of plasticizers on the barrier properties of a saran barrier layer in a multi-layer thermoplastic packaging film is described. First, the Gillio-tos et al. patent discloses that homopolymers of vinylidene chloride cannot be converted into film by conventional extrusion techniques: because they decompose very rapidly at the temperature of extrusion. Second, by copolymerizing vinylidene chloride with minor amounts of one or more other monomers such as vinyl chloride, methyl acrylate, etc. it is possible to produce copolymers which, when mixed with suitable plasticizers, can be extruded into films which can be oriented by stretching to give shrinkable film. The oriented films are heat shrinkable and are widely used for packaging purposes, particularly for packaging food. As stated, vinylidene chloride copolymers need to be plasticized so that they can be satisfactorily extruded and stretched into oriented films. The greater the proportion of plasticizer the easier the polymer is to extrude and orient and the better the abuse resistance of the final product. On the other hand, the oxygen permeability of the final product also increases with increasing plasticizer content and for many purposes, especially packaging food, it is vital that the oxygen permeability should be low. In recent years, the requirements of the packaging industry have become more and more demanding and for current commercial practices permeability below 20 cc/24 hours/m$^2$/atmosphere per mil thickness is expected and a permeability below 10 is highly desirable.

U.S. Pat. No. 4,686,148, which issued on Aug. 11, 1987 to Marvin R. Havens, and U.S. Pat. No. 4,698,111 which issued on Oct. 6, 1987 to the same inventor, disclose the addition of glycerin and a plasticizer such as epoxidized soybean oil to a vinylidene chloride polymeric composition, in order to enhance thermal stability of a film having a plasticized layer of vinylidene chloride copolymer.

Accordingly, it is an object of the present invention to provide a vinylidene chloride copolymer composition which has lower oxygen transmission rate.

By lowering the oxygen transmission rate, the thickness of barrier layers and, hence, the quantity of saran required for a barrier film is reduced. Also since the thickness of saran layers can be reduced, it is another object of the present invention to provide a film wherein the saran layer is thick enough to be an effective gas barrier but thin enough so that it is not adversely affected to any significant extent by irradiation used to cross-link layers which are cross-linkable and adjacent to the saran layer in a multi-layer film.

Still another object of the present invention is to improve the thermal stability of vinylidene chloride copolymers and to lessen their tendency to degrade while being extruded.

Still another object of the present invention is to increase the extrusion rate of vinylidene chloride copolymer compositions.

Still another object of the present invention is to reduce the stickiness of vinylidene chloride copolymer compositions with respect to metal surfaces in contact with the material during its processing. These surfaces can be screw flights, channels, and die surfaces. Reduced stickiness allows longer processing times and less disruptions for purging or cleaning the extrusion system.

SUMMARY OF THE INVENTION

It has been discovered that the addition of an acrylate and/or styrene polymer to a blend of plasticizer and vinylidene chloride copolymer provides several improvements to extrusion of this material and films produced thereby. Enhanced external lubrication allows reduction of conventional plasticizers, the reduction of which improves oxygen barrier properties (i.e. reduces oxygen transmission rates). Furthermore, the improved lubrication results in generation of less shear heat during processing which leads to less polymer degradation. This allows reduction or modification to the additives normally required to prevent heat-induced degradation which, in turn, can lead to further oxygen barrier improvements. The sum of these effects permits higher extrusion speeds and orientation rates are maintained with improvements in oxygen barrier properties. In a similar manner, extrusion speed and orientation rates can be improved while the required oxygen barrier is provided by a thinner layer of vinylidene chloride copolymer.

Common methods for determining overall thermal stability for extrusion of vinylidene chloride copolymer blends with plasticizers and stabilizers involve working the blend between a pair of heated rollers or inside a heated mixing chamber. The time required for shear and temperature-induced degradation to produce a noticeably blackened polymer is a measure of effectiveness of a plasticizer/stabilizer combination in promoting heat stability. Commercially acceptable vinylidene chloride copolymer plasticizer/stabilizer combinations should show thermal stability times of 10-15 minutes in a mixing chamber such as a Brabender (trademark) blender running at 300° F. and 63 revolutions per minute.

Likewise, when working the blend between a pair of heated rollers, the time for degradation may be used to show thermal stability. There are 4 conditions of degradation for which the time is observed with a heated two-roll mill. One is time to plate out. Plating out means the blend, which is on the front roller, begins to separate into its components, and small transfers will begin onto the back roller of bits of the separated components. The second is time to varnish. Varnish is the noticeably blackened polymer discussed in the paragraph above. The third is time to stickiness. Stickiness means the material has begun to stick on the metal rolls, which is an indication of its sticking on the metal components (screw flights, channels, die, etc.) of an extruder. Fourth is time to pick off. Pick-off means part of the melted blend transfers from the front roll to the back roll. For each of these four, commercially acceptable vinylidene chloride copolymer plasticizer/stabilizer combinations should show thermal stability on a two-roll heated mill of 10 to 15 minutes when the mill is running at 335° F. and 25 revolutions (front roll) per minutes and 22 revolutions (back roll) per minute.

Of course, times longer than 10-15 minutes mean performance even better than what is already commercially acceptable, which means longer extrusion runs due to less down time, as discussed above.

It has been found that the addition of approximately 2% by weight of acrylate/styrene polymer to a blend of 2% by weight of epoxidized oil and 96% vinylidene chloride copolymer will in most cases maintain or improve the thermal stability of the composition (all weight percents herein are weight percents of the final blended composition), compared with a composition of 4% by weight of epoxidized oil and 96% vinylidene chloride copolymer.

Thus, in one aspect, the present invention is an extrudable vinylidene chloride polymeric composition comprising 1% to 4% acrylate/styrene polymer and 1 to 4% plasticizer, especially epoxidized oil, with the balance comprising one or more vinylidene chloride copolymers. This balance is 98% to 92% by weight vinylidene chloride copolymer.

Preferred acrylate/styrene polymers are butyl acrylate/methyl methacrylate/styrene polymers, butyl acrylate/butyl methacrylate/methyl methacrylate polymers and poly (alpha-methylstyrene), and mixtures thereof. Preferred epoxidized oils are epoxidized linseed oil and epoxidized soybean oil. The plasticizer may be selected from the group consisting of epoxidized linseed oil, epoxidized soybean oil, epoxidized alpha olefin, epoxidized ester, tetraethylene glycol di(2-ethylhexoate), epoxidized plasticizers, epoxy plasticizers, and combinations thereof.

In another aspect, the present invention is a multi-layer polymeric film comprising first and second surface layers with a vinylidene chloride copolymer layer disposed between said surface layers in which the vinylidene chloride copolymer layer includes the materials as specified above.

In still another aspect, the present invention is a method of making a film comprising mixing epoxidized plasticizer, such as epoxidized soybean oil, with vinylidene chloride copolymer; blending the resulting mixture with acrylate polymer; and thereafter extruding a film from the mixture.

Still other aspects of the present invention include irradiation of a multi-layer film employing acrylate/styrene polymer in the saran layer as specified above to cross-link the cross-linkable layers. Such cross-linkable layers may be surface layers or internal layers in addition to the saran layer and are preferably selected from the group consisting of ethylene-vinyl acetate copolymers, branched polyethylene, linear low density and very low density polyethylene, and blends thereof.

DEFINITIONS

As used herein, the following terms are understood to have the meaning set forth below.

By the term "acrylate/styrene" polymer, it is intended to mean additives for the vinylidene chloride copolymer, which additives are polymers that have acrylate, polymers that have styrene, or polymers that have both acrylate and styrene, such as methyl methacrylate/butyl acrylate/styrene polymer, butyl acrylate/butyl methacrylate/methyl methacrylate polymer, and poly (alpha-methylstyrene). Blends of these are also included.

"Polymer" means the product of polymerization and includes but is not limited to homopolymers, monopolymers, copolymers, interpolymers, terpolymers, block copolymers, graft copolymers, alternating copolymers, and addition copolymers.

"Plasticizer" means a substance or material incorporated in a film or film layer to increase the flexibility, workability, or extrudability of the film. These substances include both monomeric plasticizers and polymeric plasticizers and are generally those material which function by reducing the normal intermolecular forces in a resin thus permitting the macromolecules to slide over one another more freely. Other known plasticizers with epoxy groups attached such as, epichlorohydrin/bisphenol A epoxy, epoxidized linseed oil, and epoxidized soybean oil also function as plasticizers by reducing intermolecular forces and, as well, act as scavengers for HCl. Hydrogen chloride is a by-product of the degradation of saran.

"Oriented" or "Orientation" refer to the process of stretching a hot plastic article followed by cooling to realign a molecular configuration thus improving mechanical properties. Stretching in one direction is called uniaxial orientation and in two directions is called biaxial orientation. In thermoplastic films which have been oriented there is an internal stress remaining in the plastic sheet which can be relieved by reheating the sheet to a temperature above that at which it was oriented. The material will then tend to shrink back to the original dimensions it had before it was stretch oriented.

"Vinylidene chloride polymer" or "vinylidene chloride copolymer" or "saran" means vinylidene chloride copolymerized with at least one other monomer. This includes, but is not limited to vinylidene chloride vinyl chloride copolymer, vinylidene chloride acrylonitrile copolymer, vinylidene chloride methyl acrylate copolymer, vinylidene chloride butyl acrylate copolymer, other vinylidene chloride alkyl acrylate copolymers, and mixtures thereof. Thus, included are blends of vinylidene chloride methyl acrylate copolymer and vinylidene chloride vinyl chloride copolymer. Vinylidene chloride methyl acrylate copolymer is designated by the abbreviation PVDC-MA and vinylidene chloride vinyl chloride copolymer is designated by the abbreviation PVDC-VCl.

"Barrier" refers to a property in thermoplastic materials which indicates that the particular material has a very low permeability to gases. The principal barrier materials referred to herein are the vinylidene chloride copolymers designated as "saran", hydrolyzed ethylene-vinyl acetate copolymers designated (also known as ethylene vinyl alcohol copolymers) by the abbreviations: "HEVA" (of "EVOH"), and acrylonitrile styrene copolymers such as those sold under the tradename Barex 210 or Barex 218 by BP Chemicals.

DETAILED DESCRIPTION

One significant result of the present invention is that the barrier properties of films made in accordance with the present invention are improved while the thermal stability of these same films is usually maintained and in some cases improved as well. This is demonstrated in Table 2 below which tabulates various barrier (saran) layer resin compositions with the resulting thermal stability and/or oxygen transmission rate for the film samples.

The film structure in each example of Table 2 was:
sealant layer/core layer/barrier layer/abuse layer where:
sealant layer=70% very low density polyethylene+30% ethylene vinyl acetate copolymer (9% VA);
core layer=ethylene vinyl acetate copolymer (19% VA);
barrier layer=(to be defined below); and
abuse layer=ethylene vinyl acetate copolymer (9% VA).

The film structures in each example of Tables 3 and 4 were like those of Table 2, except that for the defined barrier layer the amounts were measured as parts per hundred (pph) of vinylidene chloride copolymer resin instead of on a weight % basis as they were in Table 2, and except that the sealant layer was 90% ethylene vinyl acetate copolymer (6% VA) +10% linear low density polyethylene (density 0.920).

The materials used in the different barrier layer compositions are identified in Table 1 below, with "S" indicating vinylidene chloride copolymer; "O" indicating epoxidized oil; "A" indicating acrylate/styrene copolymer; "AMS" indicating an alternative acrylate/styrene copolymer; "A-BMA" indicating another alternative acrylate/styrene copolymer, namely butyl acrylate/butyl methacrylate/methyl methacrylate polymer; and "P" indicating alternative plasticizers.

TABLE 1

| Material | Name | Description | Source |
|---|---|---|---|
| S-1 | MA 134 | Vinylidene Chloride/ Methyl Acrylate Copolymer (8.5 wt. % MA) | Dow |
| S-2 | WV 323 | Vinylidene Chloride/ Vinyl Chloride Copolymer (26.8 wt. % VC) | Solvay |
| S-3 | PV 858 | Vinylidene Chloride/ Vinyl Chloride Copolymer (20.6 wt. % VC) | Solvay |
| S-4 | PV 891 | Vinylidene Chloride/ Methyl Acrylate Copolymer (8.5 wt. % MA) | Solvay |
| S-5 | PV 325 | Vinylidene Chloride/ Vinyl Chloride Copolymer (26.5 wt. % VC) | Solvay |
| O-1 | Vikoflex 7177 | Epoxidized Soybean Oil | Viking |
| O-2 | Plas-Chek 775 | Epoxidized Soybean Oil | Ferro |
| O-3 | Plastofix 2307 | Epoxidized Soybean Oil | Ferro |
| O-4 | Plastolein 9232 | Epoxidized Soybean Oil | Henkel |
| A-1 | Metablen P 710 | Methyl Methacrylate/ Butyl Acrylate/Styrene Polymer | Atochem |
| A-2 | Paraloid K 175 | Methyl Methacrylate/ Butyl Acrylate/Styrene Polymer | Rohm & Haas |
| A-3 | Kaneka PA 100 | Methyl Methacrylate/ Butyl Acrylate/Styrene Polymer | Kaneka |
| A-4 | Vestiform | Methyl Acrylate/Styrene Copolymer | Huels |
| AMS-1 | Amoflow 18-240 | Poly(alpha-methylstyrene) | Amoco |
| A-BMA | Metablen L1000 | Butyl Acrylate/Butyl Methacrylate/Methyl Methacrylate Polymer | Atochem |
| CR | | Calcium Ricinoleate | Caschem |
| P-1 | Vikoflex 5075 | Epoxidized Propylene Glycol Dioleate | Viking |
| P-2 | Vikolox 16 | Epoxidized alpha olefin | Viking |
| 629A | | Oxidized Polyethylene | Allied Signal |

Note: Metablen P710 is by weight 44 % methyl methacrylate, 30 % butyl acrylate, and 26% styrene, with an error of 10%. Its weight average molecular weight is 102,700, with a standard deviation of 2000. Metablen L1000 is by weight 19% butyl acrylate, 29% butyl methacrylate, and 53% methyl methacrylate, with an error of 10%. Its weight average molecular weight is 223,000, with a standard deviation of 4000. Kaneka PA 100 is by weight 29% butyl acrylate, 38.7% styrene, and 32.3% methyl methacrylate, with an error of 10%. Its weight average molecular weight is 122,800, with a standard deviation of 4600. Paraloid K175 is by weight 26.1% butyl acrylate, 30.4% styrene, and 43.5% methyl methacrylate, with an error of 10%. Its weight average molecular weight is 84,400, with a standard deviation of 400.

TABLE 2

| Ex. | Composition (Weight %) | Thermal Stability on Brabender (minutes) | Oxygen Transmission (cc/24 hours/ sq meter/atm per mil thickness) (ASTM D 3985) |
|---|---|---|---|
| 1. | 96% S-1 + 4% O-1 (Comparison) | 32.5 | 5.42 |
| 2. | 96% S-1 + 4% O-2 (Comparison) | 36.0 | 5.42 |
| 3. | 96% S-1 + 2% O-2 + 2% A-2 | 38.0 | 2.72 |
| 4. | 96% S-1 + 2% O-2 + 2% A-2 | 28.0 | 2.54 |
| 5. | 96% S-1 + 2% O-2 + 2% A-3 | 30.0 | 3.50 |
| 6. | 95.5% S-1 + 2% O-2 + 2% A-3 + 0.5% CR | 45.0 | 3.06 |
| 7. | 95.5% S-1 + 2% O-2 + 2% A-3 + 0.5% 629A | 41.0 | — |
| 8. | 96% S-1 + 4% O-4 | 36.5 | — |
| 9. | 96% S-1 + 4% O-3 | 37.0 | — |
| 10. | 48% S-2 + 48% S-3 + 4% O-2 | 30 | — |
| 11. | 48% S-2 + 48% S-3 + 2% O-2 + 2% A-1 | 27 | — |
| 12. | 47% S-2 + 47% S-3 + | 25 | — |
| 13. | 2% O-2 + 2% A-1 47.75% S-2 + 47.75% S-3 + 2% O-2 + 2% A-1 + 0.5% CR | 34 | — |
| 14. | 67.2% S-2 + 28.8% S-3 + 4% O-2 | 22 | 11.8 |
| 15. | 67.2% S-2 + 28.8% S-3 + 2% O-2 + 2% A-1 | 17 | — |
| 16. | 65.8% S-2 + 28.2% S-3 + 2% O-2 + 4% A-1 | 16 | — |
| 17. | 66.85% S-2 + 28.65% S-3 + 2% O-2 + 2% A-1 + 0.5% CR | 22 | — |
| 18. | 96% S-4 + 2% O-2 + 2% A-3 | — | 3.7 |
| 19. | 96% S-4 + 2% O-2 + 2% A-3 | — | 4.1 |
| 20. | 96% S-1 + 2% O-1 + 2% A-3 | — | 3.5 |
| 21. | 96% S-1 + 2% O-1 + 2% A-2 | — | 2.9 |
| 22. | 96% S-4 + 4% O-1 | — | 7.1 |
| 23. | 96% S-2 + 2% O-2 + 2% AMS-1 | 40.0 | |
| 24. | 96% S-1 + 4% P-1 | 40.0 | |
| 25. | 96% S-1 + 4% P-2 | 75.0 | |

Note that the S-4 of Example 18 had average particle size of 165 microns, and the S-4 of Example 19 had average particle size of 189 microns.

TABLE 3

| Ex. | Composition (pph) | Thermal Stability (Minutes) on 2-Roll Heated Mill | | | | Ease of Cleaning at End of Test |
|---|---|---|---|---|---|---|
| | | Sticking | Plating | Pick Off | Varnish | |
| 1. | 100 S-1 2 O-2 (Comparison) | instant | instant | 5(slight) 11(heavy) | 17 | Very Difficult |
| 2. | 100 S-1 2 O-2 1 A-BMA | 4(slight) | 2(very slight) | 21(slight) | 21.5 | Easier than Ex. 1 |
| 3. | 100 S-1 2 O-2 | 12(slight) | none | 24(slight) | 24 | Easy |

TABLE 3-continued

| Ex. | Composition (pph) | Thermal Stability (Minutes) on 2-Roll Heated Mill | | | | Ease of Cleaning at End of Test |
|---|---|---|---|---|---|---|
| | | Sticking | Plating | Pick Off | Varnish | |
| 4. | 100 S-1<br>2 O-2<br>2 A-BMA | 25(slight) | none | none | 25 | Very Easy |
| 5. | 100 S-1<br>2 O-2<br>4 A-BMA | None Thru End of Test at 35 | none | none | none | Very Easy |
| 6. | 100 S-1<br>2 O-2<br>6 A-BMA | None Thru End of Test at 35 | none | none | none | Easiest of all |
| 7. | 100 S-1<br>2 O-2<br>8 A-BMA | 5(slight) | 3(very slight) | 18.5 | 10 | Moderately Difficult |
| 8. | 100 S-2<br>2 O-2<br>2 A-1 | 7(slight) | 15 | 13 | 16 | Easy |
| 9. | 100 S-2<br>2 O-2<br>3 A-BMA | This film was made, but tests were not performed on it. | | | | |

Note: Above 3 BMA, the melt with S-2 became milky, indicating incompatibility between vinylidene chloride-vinyl chloride and Metablen L1000. By comparing Ex. 3 of Table 3 with Ex. 7 of Table 3, it can be seen that Metablen L1000 was more effective in vinylidene chloride methyl acrylate than was Metablen P710. Also, by comparing Ex. 3 of Table 3 with Ex. 8 of Table 3, it can be seen that L1000 was more effective in vinylidene chloride methyl acrylate than in vinylidene chloride vinyl chloride.

TABLE 4

| Ex. | Composition (pph) | Oxygen Transmission (cc/24 hours/sq meter/atm per mil thickness) (ASTM D 3985) |
|---|---|---|
| 1. | 100 S-1 +<br>4 O-2<br>(Comparison) | 5.42 |
| 2. | 100 S-1 +<br>2 O-2<br>(Comparison) | 2.40 |
| 3. | 100 S-1 +<br>2 O-2 +<br>2 A-1 | 2.60 |
| 4. | 100 S-1 +<br>2 O-2 +<br>1 A-BMA | 2.56 |
| 5. | 100 S-1 +<br>2 O-2 +<br>2 A-BMA | 3.23 |
| 6. | 100 S-1 +<br>2 O-2 +<br>4 A-BMA | 4.31 |
| 7. | 100 S-5 +<br>4 O-2 +<br>(Comparison) | 11.8 |
| 8. | 100 S-5 +<br>2 O-2<br>(Comparison) | 5.8 |
| 9. | 100 S-5 +<br>2 O-2 +<br>2 A-1 | 8.8 |
| 10. | 100 S-5 +<br>2 O-2 +<br>1 A-BMA | 6.1 |
| 11. | 100 S-5 +<br>2 O-2 +<br>2 A-BMA | 6.9 |
| 12. | 100 S-5 +<br>2 O-2 +<br>3 A-BMA | 8.5 |

With regard to Table 4, it can be seen that the formulations containing P710 or L1000 as the acrylate/styrene copolymer are better barriers to the transmission of oxygen than the formulations with 4% epoxidized soybean oil but no acyrlate/styrene copolymer. Thus improved processability is achieved by incorporating acrylate/styrene copolymer without exceeding the oxygen transmission rate of the formulations containing 4% epoxidized soybean oil but no acrylate/styrene copolymer.

It is thus seen that the product of this invention produces superior results. While many details of the invention are specified above such details are by way of examples and are not limiting. The spirit and scope of the invention are limited only as set forth in the following claims. Materials such as poly(alpha-methylstyrene) can be substituted for the acrylate/styrene polymer with beneficial effect.

What is claimed is:

1. A multilayer polymeric film comprising:
    a) first and second surface layers; and
    b) disposed between said surface layers, a polymeric layer consisting essentially of
        1) 1 to 4 weight percent plasticizer,
        2) a polymer comprising mer units derived from butyl acrylate, butyl methacrylate, and methyl methacrylate, and
        3) 92 to 98 weight percent of at least one polymer comprising mer units derived from vinylidene chloride.

2. The film of claim 1 wherein the polymer of said surface layers comprises mer units derived from one or more olefinic materials.

3. The film of claim 2 wherein said surface layers comprise a polymer selected from the group consisting of ethylene-vinyl acetate copolymers, branched low density polyethylene, linear low density polyethylene, very low density polyethylene, and blends thereof.

4. The film of claim 1 wherein said plasticizer is a material comprising at least one epoxy group.

5. The film of claim 4 wherein said material comprising at least one epoxy group is selected from the class consisting of epoxidized linseed oil, epoxidized soybean oil, epoxidized α-olefin, and epoxidized ester.

6. The film of claim 1 wherein said plasticizer is tetraethylene glycol di(2-ethylhexoate).

7. The film of claim 1 wherein said at least one polymer comprising mer units derived from vinylidene chloride further comprises mer units derived from at least one of vinyl chloride, acrylonitrile, and an alkyl acrylate.

8. The film of claim 1 wherein at least one of said layers is biaxially oriented.

9. The film of claim 1 wherein said film is crosslinked.

10. The film of claim 1 wherein said polymer comprising mer units derived from butyl acrylate, butyl methacrylate, and methyl methacrylate is present in an amount of up to about 7.3 weight percent.

11. The film of claim 1 wherein said polymer comprising mer units derived from butyl acrylate, butyl methacrylate, and methyl methacrylate comprises:
    (a) from about 15 to about 25 weight percent mer units derived from butyl acrylate;
    (b) from about 25 to about 35 weight percent mer units derived from butyl methacrylate; and
    (c) from about 40 to about 60 weight percent mer units derived from methyl methacrylate.

12. The film of claim 11 wherein at least one of said layers is biaxially oriented.

13. The film of claim 11 wherein said film is crosslinked.

14. The film of claim 11 wherein said polymer of said surface layers comprises mer units derived from one or more olefinic materials.

15. The film of claim 11 wherein said plasticizer is a material comprising at least one epoxy group.

16. The film of claim 15 wherein said material comprising at least one epoxy group is selected from the class consisting of epoxidized linseed oil, epoxidized soybean oil, epoxidized α-olefin, and epoxidized ester.

17. The film of claim 11 wherein said at least one polymer comprising mer units derived from vinylidene chloride further comprises mer units derived from at least one of vinyl chloride, acrylonitrile, and an alkyl acrylate.

* * * * *